(12) United States Patent
Oyama

(10) Patent No.: US 6,991,353 B2
(45) Date of Patent: Jan. 31, 2006

(54) VEHICLE HEADLAMP

(75) Inventor: Hiroo Oyama, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 185 days.

(21) Appl. No.: 10/651,011

(22) Filed: Aug. 28, 2003

(65) Prior Publication Data

US 2005/0078488 A1 Apr. 14, 2005

(30) Foreign Application Priority Data

Dec. 4, 2002 (JP) .................................. 2002-352720

(51) Int. Cl.
*F21V 7/00* (2006.01)

(52) U.S. Cl. .................. 362/517; 362/516; 362/518
(58) Field of Classification Search ................ 362/516, 362/517, 518
See application file for complete search history.

(56) References Cited

U.S. PATENT DOCUMENTS

| 6,419,380 | B2 | * | 7/2002 | Oyama et al. | ............... | 362/517 |
| 6,454,448 | B2 | * | 9/2002 | Taniuchi et al. | ............ | 362/517 |
| 6,471,383 | B1 | * | 10/2002 | Oyama et al. | ............... | 362/517 |
| 6,575,609 | B2 | * | 6/2003 | Taniuchi et al. | ............ | 362/517 |
| 2004/0022067 | A1 | * | 2/2004 | Taniuchi | ..................... | 362/517 |

FOREIGN PATENT DOCUMENTS

JP 2002-234380 8/2002

* cited by examiner

*Primary Examiner*—Thomas M. Sember
*Assistant Examiner*—James W Cranson, Jr.
(74) *Attorney, Agent, or Firm*—Weingarten, Schurgin, Gagnebin & Lebovici LLP

(57) ABSTRACT

In a conventional vehicle headlamp, when improvement in the visibility at the time of turning the vehicle is attempted by turning the light distribution characteristic, if a part of the light is turned, the quantity of light becomes insufficient as a whole, and if the whole light distribution is turned, the visibility straight ahead becomes insufficient.

According to the present invention, there is provided a vehicle headlamp 1 comprising: one light source 2; a first light distribution-forming reflecting surface 3 forming a light distribution shape for a diagonally rising portion, and consisting of double reflecting surfaces, that is, a primary reflecting surface which is an elliptic type, and a secondary reflecting surface which is a parabolic type; a second light distribution-forming reflecting surface 4 forming a light distribution shape in a wide range below the horizontal line, and consisting of double reflecting surfaces, that is, a primary reflecting surface which is an elliptic type, and a secondary reflecting surface which is a parabolic type; and a third light distribution-forming reflecting surface 5 forming a light distribution shape in a narrow range below the horizontal line, wherein at least one of the first light distribution-forming reflecting surface to the third light distribution-forming reflecting surface is rotatable in the horizontal direction. As a result, the turning direction and the direction straight ahead can be illuminated with sufficient quantity of light, to thereby solve the problems.

13 Claims, 4 Drawing Sheets

VEHICLE HEADLAMP

BACKGROUND OF THE INVENTION

1. Field of the Invention

The present invention relates to a vehicle headlamp, and more specifically, relates to the configuration of the vehicle headlamp, in which the irradiation direction is turned, linked with a steering unit or the like, and for example, in a winding road or an intersection, the forward direction can be illuminated well, so that an object or the like can be found easily, thereby improving the safety.

2. Description of the Related Art

As the conventional vehicle headlamp in which the visibility in the traveling direction is improved, linked with the steering unit, there is one in which a reflector or an assembly obtained by assembling a reflector and a light source is turned towards the traveling direction according to the operation of the steering unit.

At this time, if only the reflector or the assembly is simply turned, the light distribution characteristic at the time of going straight is simply shifted to the turning direction, and hence it is not always a desired shape as the light distribution characteristic required when the vehicle turns. Therefore, a diffusion cut is applied at a portion of an outer lens where the light transmits when the reflector is turned, to increase the diffusion in the horizontal direction. (For example, see Japanese Patent Application laid-Open No. 2002-234380).

SUMMARY OF THE INVENTION

In such type of conventional headlamp, however, since the whole reflector or the whole assembly is turned, as described above, even if a supplementary lens cut is applied in a portion of the outer lens on the light turn side, the tendency of the light distribution characteristic optimized for driving a straight road remains strongly. Therefore, in a zigzag mountain road or a narrow intersection, sufficient brightness cannot be distributed in the traveling direction, thereby causing a problem in that visibility cannot be ensured sufficiently.

With the configuration for turning the whole reflector, if a large turning angle is set corresponding to a large manipulated variable of the steering unit as described above, the whole light distribution characteristic turns at the time of operation, and hence, the light quantity distributed forwards of the vehicle becomes extremely small. For example, the visibility from a vehicle in the opposite lane toward the vehicle in the lane on this side in an intersection or the like deteriorates, causing a safety problem, which should be solved.

As specific means for solving the above-described conventional problems, there is provided a vehicle headlamp comprising: one light source; a first light distribution-forming reflecting surface forming a first light distribution shape irradiating a diagonally rising portion of the light distribution on the road side in a spot form by the light from the light source, and consisting of double reflecting surfaces, that is, a primary reflecting surface which is an elliptic type, and a secondary reflecting surface which is a parabolic type; a second light distribution-forming reflecting surface forming a second light distribution shape irradiating a horizontally wide range below the horizontal line by the light from the light source, and consisting of double reflecting surfaces, that is, a primary reflecting surface which is an elliptic type, and a secondary reflecting surface which is a parabolic type; and a third light distribution-forming reflecting surface forming a third light distribution shape irradiating a relatively narrow range horizontally below the horizontal line by the light from the light source, wherein at least one of the first light distribution-forming reflecting surface to the third light distribution-forming reflecting surface is rotatable in the horizontal direction.

DESCRIPTION OF THE PREFERRED EMBODIMENT

Figure 1:
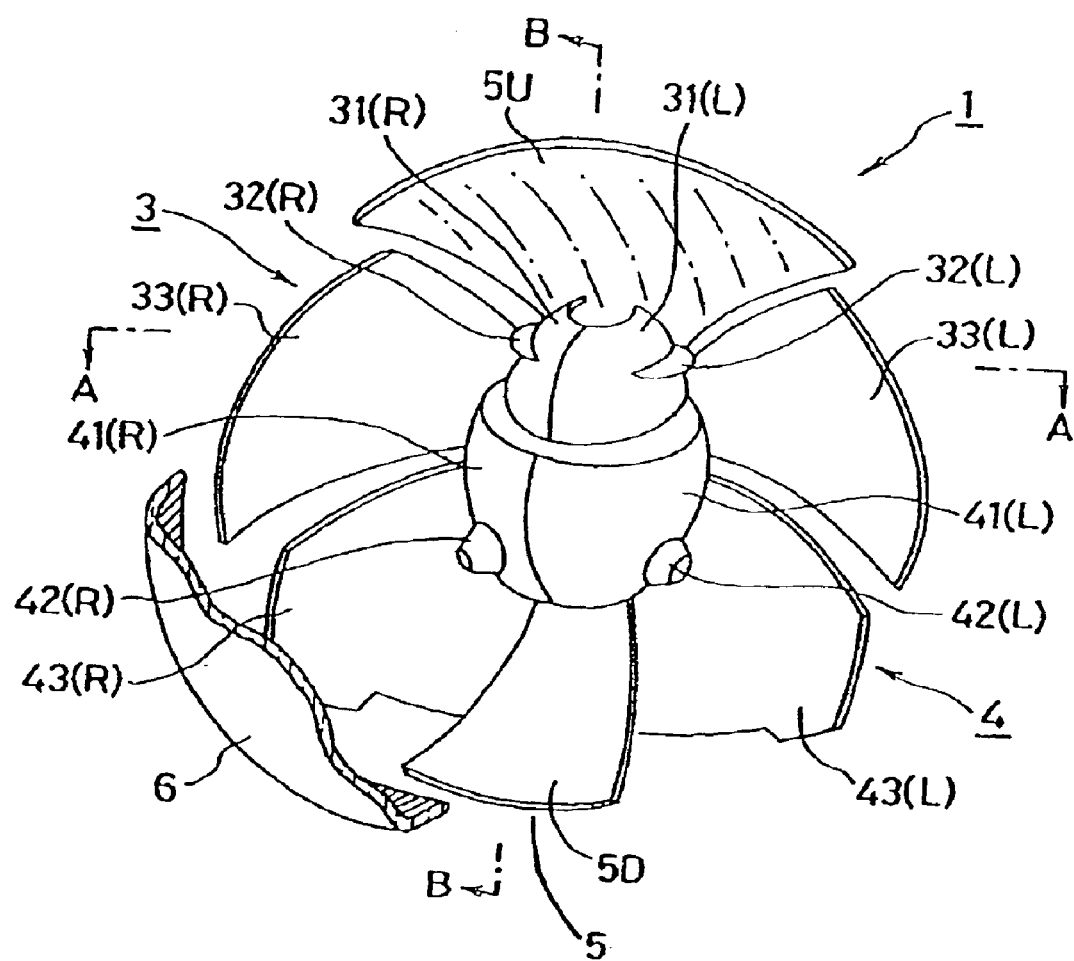
FIG. 1 is a perspective view showing a vehicle headlamp according to the present invention, with a part thereof is broken down.
Figure 2:
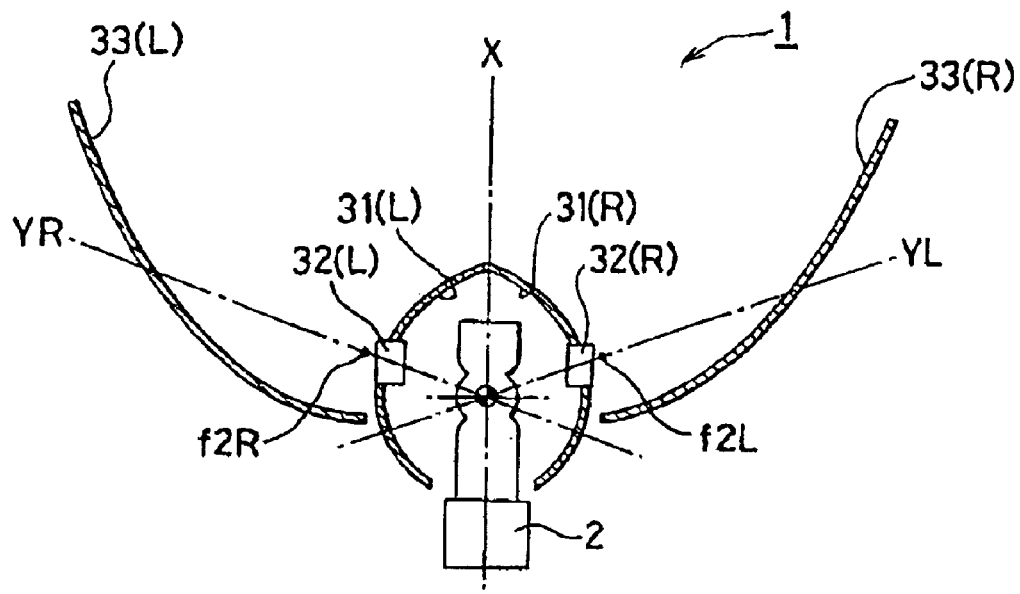
FIG. 2 is a sectional view along the line A—A in FIG. 1.
Figure 3:
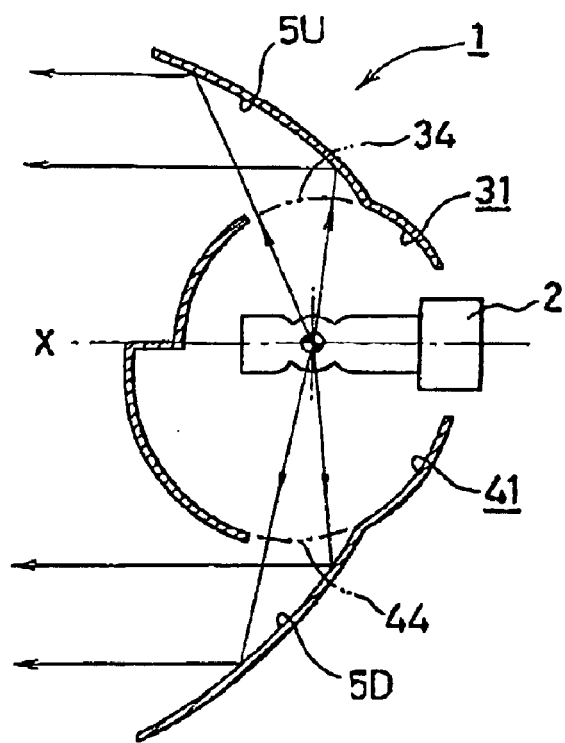
FIG. 3 is a sectional view along the line B—B in FIG. 1.

The present invention will be described in detail, based on the embodiment shown in the figure. FIG. 1 to FIG. 3 show a vehicle headlamp 1 according to the present invention. FIG. 1 is a perspective view showing the arrangement of a first light distribution-forming reflecting surface 3, a second light distribution-forming reflecting surface 4 and a third light distribution-forming reflecting surface 5, as seen from the front, with a part of an outer lens 6 not shown. In the condition shown in FIG. 1, a light source 2 such as a metal halide discharge lamp is not seen, surrounded by a part of the first light distribution forming reflecting surface 3 and the second light distribution-forming reflecting surface 4.

Here, the first light distribution-forming reflecting surface 3 and the second light distribution-forming reflecting surface 4 have substantially the same construction, consisting of a primary reflecting surface which is an elliptic type, and a secondary reflecting surface which is a parabolic type. The construction of these two reflecting surfaces is schematically shown in FIG. 2, showing the first light distribution forming reflecting surface 3 as an example.

FIG. 2 is a sectional view showing the first light distribution-forming reflecting surface 3, by breaking down the first light distribution-forming reflecting surface 3 substantially along the horizontal direction, as shown by the line A—A in FIG. 1. The first light distribution-forming reflecting surface 3 is provided upwards of the light source 2, wherein the light from the light source 2 is received by a primary reflecting surface 31, and the received light is reflected toward a secondary reflecting surface 33 described later.

The primary reflecting surface 31 is an elliptic type, for example a spheroidal plane, designating the light source 2 as a first focal point. The primary reflecting surface 31 is provided with a right primary reflecting surface 31R and a left primary reflecting surface 31L, so as to wrap the light source 2 from right and left. The right and left direction herein is such a direction that the vehicle headlamp 1 fitted to the vehicle body is seen from the driver's seat.

At this time, the right primary reflecting surface 31R is set with the major axis YR being toward the left direction or toward the back and front of the left direction, and the left primary reflecting surface 31L is set with the major axis YL being toward the right direction or toward the back and front of the right direction. By having such a construction, the major axis YR of the right primary reflecting surface 31R intersects the left primary reflecting surface 31L, and a left opening 32L is provided at the intersection.

Similarly, a right opening 32R is provided at the intersection where the major axis YL of the left primary reflecting surface 31L intersects the right primary reflecting surface 31R. A second focal point f2R of the right primary reflecting surface 31R is set in the vicinity of the left opening 32L provided in the left primary reflecting surface 31L, and a second focal point f2L of the left primary reflecting surface 31L is set in the vicinity of the right opening 32R provided in the right primary reflecting surface 31R.

By having such a construction, the light from the light source 2 surrounded by the primary reflecting surfaces 31 (R, L) is discharged outside from the openings 32 (R, L). In the vehicle headlamp 1 of the present invention, a right secondary reflecting surface 33R, in which the vicinity of the right opening 32R, that is, the vicinity of the second focal point f2L on the left primary reflecting surface 31L is designated as a focal point, and the axis thereof is a paraboloid of revolution substantially agreeing with the irradiation direction X of the vehicle headlamp 1, is provided on the right side of the primary reflecting surface 31 (R, L) substantially in the horizontal direction, and a left secondary reflecting surface 33L is provided corresponding to the right primary reflecting surface 31R, in the similar manner.

Though not shown, the second light distribution-forming reflecting surface 4 also comprises primary reflecting surfaces 41 (R, L), being an elliptic type similarly to the first light distribution-forming reflecting surface 3 described above, openings 42 (R, L) provided in the primary reflecting surfaces 41 (R, L), and secondary reflecting surfaces 43 (R, L), being a parabolic type, wherein the light reflected by the right primary reflecting surface 41R forms a second focal point in the vicinity of the left opening 42L provided on the left primary reflecting surface 41L, and a left secondary reflecting surface 43L designating this second focal point as a focal point is provided, to reflect the light in the irradiation direction of the vehicle headlamp 1. The second light distribution forming reflecting surface 4 is installed downwards of the light source 2, in order to avoid a positional interference with the first light distribution forming reflecting surface 3.

As shown in FIG. 3, a notch portion 34 is provided on the primary reflecting surface 31 of the first light distribution-forming reflecting surface 3 above the light source 2, and a similar notch portion 44 is provided on the second light distribution-forming reflecting surface 4 below the light source 2, so that the light from the light source 2 is emitted upward and downward.

An upper reflecting surface 5U, being the third light distribution-forming reflecting surface 5 which is a parabolic type, such as a paraboloid of revolution, designating the light source 2 as the focal point, is arranged in the upper part where the light of the light source 2 is emitted, and a lower reflecting surface 5D, being also a parabolic type, and also designating the light source 2 as the focal point, is arranged in the lower part where the light of the light source 2 is emitted.

At this time, the notch portions 34 and 44 perform a function of providing the light from the light source 2 to the upper reflecting surface 5U and the lower reflecting surface SD, and also serve as ventilation and cooling means for the light source 2, which becomes a closed condition by surrounded by the primary reflecting surface 31 of the first light distribution-forming reflecting surface 3 and the primary reflecting surface 41 of the second light distribution-forming reflecting surface 4.

Figure 4:
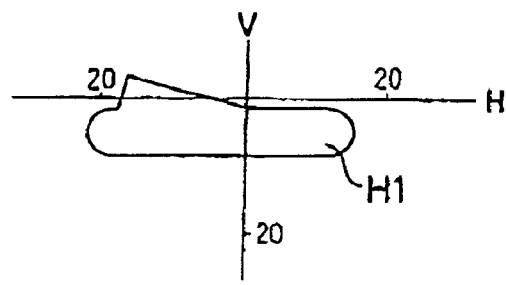
FIG. 4 is a diagram showing the light distribution characteristic obtained by a first light distribution-forming reflecting surface.
Figure 5:
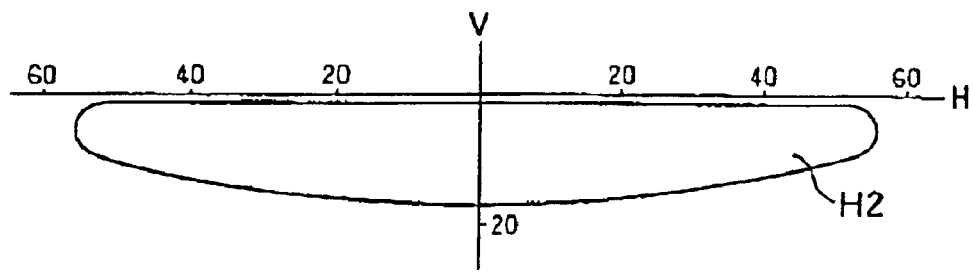
FIG. 5 is a diagram showing the light distribution characteristic obtained by a second light distribution-forming reflecting surface.
Figure 6:
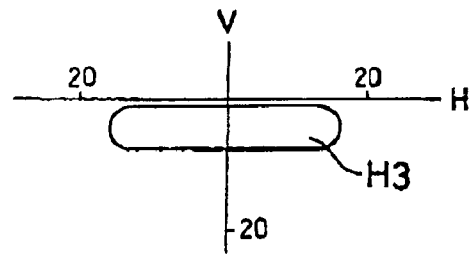
FIG. 6 is a diagram showing the light distribution characteristic obtained by a third light distribution-forming reflecting surface.

FIG. 4 to FIG. 6 show the light distribution characteristic of the vehicle headlamp 1 having the above-described configuration. FIG. 4 shows a middle stage light distribution characteristic H1 formed by the first light distribution forming reflecting surface 3. In the present invention, the shape of the light distribution formed by the first light distribution-forming reflecting surface 3 leans to the left by 15°, in the case of left-hand traffic, mainly for the shape of a portion which improves the visibility on the side strip side. At this time, the diffusion by the first light distribution-forming reflecting surface 3 is in a relatively narrow range, such as about 15° to 20° right and left, and about 5° to 10° downward, having relatively high illuminance.

FIG. 5 shows a lower stage light distribution characteristic H2 formed by the second light distribution forming reflecting surface 4. The second light distribution-forming reflecting surface 4 forms a light distribution shape diffused about 50° to 60° right and left, and about 15° to 20° downward, and particularly, diffused in a wider range in the right and left direction as compared with the conventional example, and having necessary and sufficient illuminance for checking an obstacle visually. In addition, the light is not distributed upward than the horizontal line, so that the driver in a vehicle in the opposite lane is not dazed. The breadth of the light distribution in the right and left direction is particularly wider than the conventional example.

FIG. 6 shows an upper stage light distribution characteristic H3 formed by the third light distribution-forming reflecting surface 5, wherein the light is diffused in a relatively narrow range, such as about 20° right and left, and about 5° to 10° downward, having relatively high illuminance. In addition, the light is not distributed upward than the horizontal line, as with the second light distribution forming reflecting surface 4.

As described above, in the vehicle headlamp 1 of the present invention, in which the light distribution shapes from the respective light distribution-forming reflecting surfaces 3 to 5 are set, at least one of the above-described middle stage light distribution characteristic H1, the lower stage light distribution characteristic H2 and the upper stage light distribution characteristic H3 is shifted horizontally corresponding to the manipulated variable of the steering unit, thereby optimum light distribution can be obtained at the time of turning of the vehicle. As a result, the performance of the vehicle headlamp 1 can be improved.

In other words, according to the present invention, as described above, the light distribution characteristic is divided into the middle stage light distribution characteristic H1, the lower stage light distribution characteristic H2 and the upper stage light distribution characteristic H3, and at least one of the light distribution characteristics in the appropriate portion of the divided light distribution characteristics is turned corresponding to the condition of the vehicle. As a result, the illumination condition most suitable for the vehicle condition is realized, thereby enabling correspondence to various driving conditions.

Figure 7:
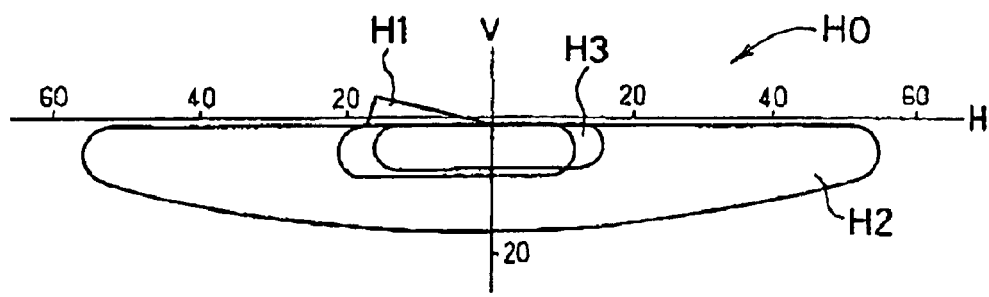
FIG. 7 is a diagram showing the combined light distribution characteristic of the vehicle headlamp according to the present invention, in the condition when the vehicle goes straight.

A reference light distribution characteristic H0 shown in FIG. 7 shows a combined condition of the middle stage light distribution characteristic H1 (see FIG. 4), the lower stage light distribution characteristic H2 (see FIG. 5) and the upper stage light distribution characteristic H3 (see FIG. 6), when the steering unit is not operated (reference condition), for example, when the vehicle goes straight. The respective light distribution characteristics H1 to H3 are combined, with the centers thereof made to agree with each other.

The action and effect of the vehicle headlamp 1 of the present invention having the above-described configuration will be described below. Since the first light distribution-forming reflecting surface 3 and the second light distribution-forming reflecting surface 4 are the double reflecting type, comprising the primary reflecting surface 31, 41 and the secondary reflecting surface 33, 43, respectively, the light source 2 is substantially surrounded by the primary reflecting surfaces 31 and 41. Therefore, the luminous flux acquisition rate with respect to the light source is particularly improved, as compared with the single reflecting type, thereby enabling realization of a bright vehicle headlamp 1.

If the above matter is explained by the condition of the reference light distribution characteristic H0, the maximum luminous flux reaches 1600 Lm, which is twice the brightness of a vehicle headlamp of the single reflecting type normally used. Therefore, for example, when only a part of the light distribution characteristic, such as the middle stage light distribution characteristic H1, is turned, not only sufficient visibility can be obtained in the turning direction of the vehicle, but also the visibility in the straight ahead direction can be still maintained by the remaining lower stage light distribution characteristic H2 or the upper stage light distribution characteristic H3. As a result, a vehicle headlamp 1 having highly practicable variable light distribution can be realized. The above-described 1600 Lm is a numerical value obtained when an HID (metal halide discharge lamp) is used as the light source. However, needless to say, even in a case where a tungsten halogen lamp or an incandescent lamp is mounted as the light source, the availability of luminous flux twice as much as that of the single reflecting type can be similarly realized.

The inventor has studied which one of the first light distribution-forming reflecting surface 3, the second light distribution-forming reflecting surface 4 and the third light distribution-forming reflecting surface 5 linked with the operation of the steering unit can correspond to the actual driving condition most appropriately, when the vehicle headlamp 1 is used as a variable light distribution type headlamp corresponding to a winding road.

Figure 8:
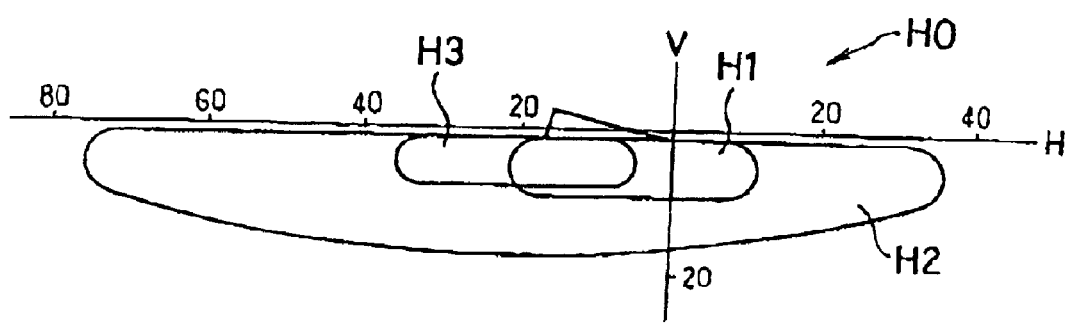
FIG. 8 is a diagram showing an example of the light distribution characteristic, when a steering gear is operated at the standing time of the vehicle.

As a result of the study, it can be confirmed that when the driving speed of the vehicle is low, it is effective to turn the light illuminating a range close to the vehicle, when the vehicle is stopped or driving speed of the vehicle is low, it is desired to turn the second light distribution-forming reflecting surface 4, and when driving of the vehicle is detected or driving speed of the vehicle more faster than driving speed of the vehicle which turns the second light distribution-forming reflecting surface 4, it is desired to turn the first light distribution-forming reflecting surface 3 and the third light distribution-forming reflecting surface 5. Moreover, it may turns the first and second light distribution-forming reflecting surface 3, 4 at the same time, or it may turns only the first light distribution-forming reflecting surface 3 or it may turns only the second light distribution-forming reflecting surface 4. However, the above result is not absolute, and for example, a certain test subject does not have uncomfortable feeling, even if the third light distribution-forming reflecting surface 5 is turned together with the second light distribution-forming reflecting surface 4 at the standing time of the vehicle, as shown in FIG. 8, or there is a test subject who feels comfortable even if the third light distribution-forming reflecting surface 5 is not turned at all at the standing or driving time of the vehicle. Moreover, for example, a test subject who mainly drives the vehicle in the urban area may feel such that it is only necessary to turn the second light distribution-forming reflecting surface 4, and even at the time of driving, it is better not to turn the first light distribution-forming reflecting surface 3.

Therefore, according to the present invention, the basic configuration is such that the second light distribution-forming reflecting surface 4 and the third light distribution-forming reflecting surface 5 are turned, with the operation of the steering unit, at the standing time of the vehicle, and when it is detected that the vehicle is driven, the first light distribution-forming reflecting surface 3 is also turned. However, for example, an interrupting device may be provided in a driving section (not shown) for turning the first light distribution-forming reflecting surface 3, so that a driver can freely set whether to turn the first light distribution-forming reflecting surface 3 according to the preference of the driver or according to the driving condition.

In the vehicle headlamp 1 of the present invention, the lower stage light distribution characteristic H2 obtained by the second light distribution-forming reflecting surface 4 is as wide as about 50° or more in the right and left direction, and for example, if the second light distribution-forming reflecting surface 4 is turned by about 30°, the irradiation range substantially reaches the side of the vehicle body. Therefore, according to the design of the vehicle, it may be difficult that the vehicle headlamp fitted on the right side of the vehicle body irradiates the range extended up to 90° on the left. In such a case, the lower stage light distribution characteristic H2 may be such that the vehicle headlamp 1 fitted on the right side turns only to the right, and the vehicle headlamp 1 fitted on the left side turns only to the left.

When the above-described light distribution is turned, for example, the lower light distribution characteristic H2 is turned, the entire second light distribution-forming reflecting surface 4, that is, the primary reflecting surface 41 and the secondary reflecting surface 42 need only to be turned, about the vertical axis passing through the light source 2. In the case where a plurality of reflecting surfaces, such as the first light distribution-forming reflecting surface 3, the second light distribution-forming reflecting surface 4 and the third light distribution-forming reflecting surface 5, shares one light source, as in the vehicle headlamp 1 of the present invention, the light source 2 may be fixed, or may be fixed on either one of the third and the fourth reflecting surfaces.

As described above, according to the present invention, the vehicle headlamp comprises: one light source; a first light distribution-forming reflecting surface forming a first light distribution shape irradiating a diagonally rising portion of the light distribution on the road side in a spot form by the light from the light source, and consisting of double reflecting surfaces, that is, a primary reflecting surface which is an elliptic type, and a secondary reflecting surface which is a parabolic type; a second light distribution-forming reflecting surface forming a second light distribution shape irradiating a horizontally wide range below the horizontal line by the light from the light source, and consisting of double reflecting surfaces, that is, a primary reflecting surface which is an elliptic type, and a secondary reflecting surface which is a parabolic type; and a third light distribution-forming reflecting surface forming a third light distribution shape irradiating a relatively narrow range horizontally below the horizontal line by the light from the light source, wherein at least one of the first light distribution-forming reflecting surface to the third light distribution-forming reflecting surface is rotatable in the horizontal direction. Therefore, there is the effect that a bright vehicle headlamp can be realized by improving the availability of luminous flux with respect to the light source up to about two times by employing double reflecting surfaces. Moreover, since the light distribution characteristic is divided into the upper stage light distribution characteristic, the middle stage light distribution characteristic, and the lower stage light distribution characteristic, and a combined light distribution characteristic is formed by combining these characteristics, the optimum portion for improving the visibility at the time of driving a vehicle on a winding road is shifted, to thereby make it easy to confirm the course ahead. Furthermore, an extremely excellent effect in improving the safety can be obtained by realizing the light distribution, which eliminates such an occasion that illumination of the vehicle in the straight ahead direction becomes insufficient, thereby damaging the visibility from a vehicle in the opposite lane, without causing insufficient quantity of light in both directions.

What is claimed is:

1. A vehicle headlamp comprising:
   one light source;
   a first light distribution-forming reflecting surface forming a first light distribution shape irradiating a diagonally rising portion of the light distribution on a road side in a spot form by the light from the light source, and consisting of double reflecting surfaces, that is, a primary reflecting surface which is an elliptic type, and a secondary reflecting surface which is a parabolic type;
   a second light distribution-forming reflecting surface forming a second light distribution shape irradiating a horizontally wide range below the horizontal line by the light from the light source, and consisting of double reflecting surfaces, that is, a primary reflecting surface which is an elliptic type, and a secondary reflecting surface which is a parabolic type; and
   a third light distribution-forming reflecting surface forming a third light distribution shape irradiating a relatively narrow range horizontally below a horizontal line by the light from the light source,
   wherein at least one of the first light distribution-forming reflecting surface or the third light distribution-forming reflecting surface is rotatable in the horizontal direction.

2. The vehicle headlamp according to claim 1, wherein the turn of the first light distribution-forming reflecting surface to the third light distribution-forming reflecting surface is such that the at least one is the second light distribution-forming reflecting surface.

3. The vehicle headlamp according to claim 1, wherein the turn of the first light distribution-forming reflecting surface to the third light distribution-forming reflecting surface is such that all of the first light distribution-forming reflecting surface to the third light distribution-forming reflecting surface and the turn of the first light distribution-forming reflecting surface is conducted only at the driving time of the vehicle, the turn of the second light distribution-forming reflecting surface is conducted at the driving and standing time of the vehicle, and the turn of the third light distribution-forming reflecting surface is conducted, synchronized with the turn of the first light distribution-forming reflecting surface or the second light distribution-forming reflecting surface.

4. The vehicle headlamp according to claim 2, wherein the turn of the second light distribution-forming reflecting surface is conducted at the time of stopping the vehicle or driving speed of the vehicle is low.

5. The vehicle headlamp according to claim 2, wherein the turn of the first light distribution-forming reflecting surface is conducted at the time of driving the vehicle or driving speed of the vehicle more faster than driving speed of the vehicle which turns the second light distribution-forming reflecting surface.

6. The vehicle headlamp according to claim 3, wherein the turn of the third light distribution-forming reflecting surface is also conducted at the time of driving and stopping the vehicle.

7. The vehicle headlamp according to claim 3, wherein the turn of the third light distribution-forming reflecting surface is conducted only at the driving time of the vehicle.

8. The vehicle headlamp according to claim 1, wherein the turn of the first light distribution-forming reflecting surface to the third light distribution-forming reflecting surface is conducted by a corresponding light distribution-forming reflecting surface in the vehicle headlamp installed on the side of the turning direction to which the steering unit in the vehicle body is operated.

9. The vehicle headlamp according to claim 2, wherein the turn of the first light distribution-forming reflecting surface to the third light distribution-forming reflecting surface is conducted by a corresponding light distribution-forming reflecting surface in the vehicle headlamp installed on the side of the turning direction to which the steering unit in the vehicle body is operated.

10. The vehicle headlamp according to claim 4, wherein the turn of the first light distribution-forming reflecting surface to the third light distribution-forming reflecting surface is conducted by a corresponding light distribution-forming reflecting surface in the vehicle headlamp installed on the side of the turning direction to which the steering unit in the vehicle body is operated.

11. The vehicle headlamp according to claim 5, wherein the turn of the first light distribution-forming reflecting surface to the third light distribution-forming reflecting surface is conducted by a corresponding light distribution-forming reflecting surface in the vehicle headlamp installed on the side of the turning direction to which the steering unit in the vehicle body is operated.

12. The vehicle headlamp according to claim 6, wherein the turn of the first light distribution-forming reflecting surface to the third light distribution-forming reflecting surface is conducted by a corresponding light distribution-forming reflecting surface in the vehicle headlamp installed on the side of the turning direction to which the steering unit in the vehicle body is operated.

13. The vehicle headlamp according to claim 7, wherein the turn of the first light distribution-forming reflecting surface to the third light distribution-forming reflecting surface is conducted by a corresponding light distribution-forming reflecting surface in the vehicle headlamp installed on the side of the turning direction to which the steering unit in the vehicle body is operated.

* * * * *

UNITED STATES PATENT AND TRADEMARK OFFICE
CERTIFICATE OF CORRECTION

PATENT NO. : 6,991,353 B2
APPLICATION NO. : 10/651011
DATED : January 31, 2006
INVENTOR(S) : Hiroo Oyama It is certified that error appears in the above-identified patent and that said Letters Patent is hereby corrected as shown below:

Column 4, line 10, "SD" should read --5D--.

Signed and Sealed this

Seventh Day of November, 2006

JON W. DUDAS
*Director of the United States Patent and Trademark Office*